(12) United States Patent
Calihan et al.

(10) Patent No.: US 7,400,467 B1
(45) Date of Patent: Jul. 15, 2008

(54) METHODS AND APPARATUS FOR MANAGING WRITE INHIBIT IN RESPONSE TO A PREDICTIVE METRIC

(75) Inventors: Thomas Calihan, Longmont, CO (US); Jeff Franks, Loveland, CO (US); Xiaoping Hu, Milpitas, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/429,760

(22) Filed: May 8, 2006

Related U.S. Application Data

(60) Provisional application No. 60/724,939, filed on Oct. 7, 2005.

(51) Int. Cl.
*G11B 5/596* (2006.01)
(52) U.S. Cl. .................. 360/77.02; 360/78.04
(58) Field of Classification Search .......... None
See application file for complete search history.

(56) References Cited

U.S. PATENT DOCUMENTS

| | | | |
|---|---|---|---|
| 6,735,033 B1 * | 5/2004 | Codilian et al. .............. 360/60 |
| 6,975,477 B1 | 12/2005 | Hu et al. ..................... 360/71 |
| 6,975,482 B1 | 12/2005 | Guo et al. ................. 360/78.05 |
| 7,031,099 B2 * | 4/2006 | Kohso et al. ............. 360/78.05 |
| 2003/0103286 A1 * | 6/2003 | Bi et al. ..................... 360/60 |
| 2005/0185320 A1 * | 8/2005 | Ueda et al. ............... 360/78.04 |

* cited by examiner

*Primary Examiner*—Jason C Olson
(74) *Attorney, Agent, or Firm*—Myers Bigel Sibley & Sajovec, PA

(57) ABSTRACT

Methods of controlling reading/writing by a read/write head of a disk drive include generating a position error signal indicative of a displacement of the read/write head from a desired radial location on a surface of a data storage disk. A control signal for moving the read/write head to the desired location is calculated responsive to the position error signal. Writing by the read/write head is inhibited responsive to the control signal exceeding a control signal threshold value. A disk drive includes a controller configured to generate a position error signal indicative of a displacement of a read/write head from a desired location on a surface of a disk, and to generate a control signal for moving the read/write head to the desired location. The controller is further configured to inhibit writing by the read/write head responsive to a predictive metric that is predictive of the position error signal exceeding a threshold.

18 Claims, 6 Drawing Sheets

METHODS AND APPARATUS FOR MANAGING WRITE INHIBIT IN RESPONSE TO A PREDICTIVE METRIC

RELATED APPLICATION

This application claims the benefit of and priority to U.S. Provisional Patent Application Ser. No. 60/724,939, filed Oct. 7, 2005 entitled "Method for Managing Write Inhibit By Monitoring Controller Voltage," the disclosure of which is hereby incorporated herein by reference as if set forth in its entirety.

FIELD OF THE INVENTION

The present invention generally relates to digital data storage devices and, more particularly, to a disk drive that reads/writes data to/from tracks on a rotating disk surface in the disk drive, and related methods.

BACKGROUND

Disk drives are digital data storage devices that can enable users of computer systems to store and retrieve large amounts of data in a fast and efficient manner. A typical disk drive includes a plurality of magnetic recording disks that are mounted to a rotatable hub of a spindle motor and rotated at a high speed. An array of read/write transducers is disposed adjacent surfaces of the disks to transfer data between the disks and a host computer. The transducers can be radially positioned over the disks by a rotary actuator and a closed loop, digital servo system, and can fly proximate the surfaces of the disks upon air bearings.

A plurality of nominally concentric tracks can be defined on each disk surface. A preamp and driver circuit generates write currents that are used by the transducer to selectively magnetize the tracks during a data write operation and amplifies read signals detected by the transducer from the selective magnetization of the tracks during a data read operation. A read/write channel and interface circuit are connected to the preamp and driver circuit to transfer the data between the disks and the host computer.

The servo system can operate in two primary modes: seeking and track following. During a seek, a selected transducer is moved from an initial track to a destination track on the corresponding disk surface. The servo system applies current to an actuator coil to accelerate the transducer toward the destination track. During the seek, the servo system may sequentially measure the actual velocity of the transducer and adjust the current in relation to velocity error (i.e., the difference between the actual velocity and a target velocity). As the transducer approaches the destination track, the servo system decelerates the transducer to bring it to rest over the destination track. Thereafter, the servo system enters the track following mode wherein the transducer is maintained over the center of the destination track until another seek is performed.

Read and write operations may be performed during track following mode. In order to reduce the occurrence of off-track writes (i.e. writing while the transducer is located more than a threshold distance from the center of the desired track), the servo system may track the position of the transducer by means of a position error signal that is fed back to the servo system controller. The servo system controller moves the transducer in response to the position error signal in an attempt to minimize the position error signal.

In addition to responding to signals from the servo system, the position of the transducer may be affected by operational shock and/or vibration of the disk drive. For example, vibration and/or shock may be transmitted to the disk drive through the frame or housing in which it is mounted. In particular, operational shock may result in large position errors over short periods of time. If the position error signal exceeds a predetermined threshold level, data writing may be inhibited until the position error signal is reduced below the threshold level and/or a predetermined number of disk rotations has occurred. Although inhibiting writes based on a position error threshold is commonly implemented in disk drives, off-track writes may occur at an unacceptable rate if the threshold is set too high. However, if the threshold is reduced, the data throughput of the disk drive may be significantly impaired.

SUMMARY

Methods of controlling reading/writing by a read/write head of a disk drive according to some embodiments of the invention include generating a position error signal indicative of a displacement of the read/write head from a desired radial location on a surface of a data storage disk. A control signal for moving the read/write head to the desired radial location is calculated responsive to the position error signal. Writing by the read/write head is inhibited responsive to the control signal exceeding a control signal threshold value.

The methods may further include comparing the position error signal to a position error signal threshold, and writing by the read/write head may be inhibited responsive to the position error signal exceeding the position error signal threshold and the control signal exceeding the control signal threshold.

The position error signal threshold may be determined based on the value of the control signal. The control signal threshold may be determined based on the value of the position error signal.

The control signal may control movement of the read/write head by a piezoelectric transducer. The control signal may control movement of the read/write head by a microactuator stage of a two-stage actuator.

The methods may further include determining a maximum level of the control signal, scaling the maximum level of the control signal by a scale factor to determine the control signal threshold value, and comparing the control signal to the control signal threshold value. The methods may further include filtering the control signal with a notch filter, and applying the filtered control signal to an actuator to position the read/write head.

After inhibiting writing, the methods may further include determining if a magnitude of the control signal is below the threshold value, and responsive to the magnitude of the control signal being below the threshold value, enabling writing by the read/write head.

The methods may further include determining if the position error signal is less than a position error signal threshold. Enabling writing by the read/write head may not be performed unless the position error signal is less than the position error signal threshold.

Methods according to further embodiments of the invention of controlling a read/write head of a disk drive including an actuator stage configured to move the read/write head relative to a data storage disk include generating a position error prediction metric that is based on a control signal used to control the actuator stage and that is predictive of a position error of the read/write head relative to a desired radial location on the data storage disk, and responsive to the position error prediction metric exceeding a prediction metric threshold value, inhibiting writing by the read/write head.

Generating the position error prediction metric may be performed in response to a position error signal being less than a position error threshold value. The position error prediction metric may be generated in response to a magnitude of the control signal and/or a rate of change of the control signal.

A disk drive according to some embodiments of the invention includes a data storage disk, a read/write head configured to read data from the disk and/or to write data to the disk, an actuator configured to position the read/write head relative to the disk, and a controller configured to generate a position error signal indicative of a displacement of the read/write head from a desired location on a surface of the disk, and, responsive to the position error signal, to generate a control signal for moving the read/write head to the desired location. The controller is further configured to inhibit writing by the read/write head responsive to a predictive metric that is predictive of the position error signal exceeding a threshold.

The predictive metric may include a magnitude of the control signal, and the threshold may include a control signal threshold. The predictive metric may be generated in response to a rate of change of the control signal.

The controller may be further configured to compare the position error signal to a position error signal threshold and to inhibit writing by the read/write head responsive to the position error signal exceeding the position error signal threshold.

The controller may be configured to determine the position error signal threshold based on the value of the control signal. The controller may be further configured to determine the control signal threshold based on the value of the position error signal.

The actuator may include a piezoelectric transducer and the control signal may be used to control movement of the piezoelectric transducer. The actuator may include microactuator stage of a two-stage actuator.

The controller may be further configured to determine a maximum level of the control signal, to scale the maximum level of the control signal by a scale factor to generate the control signal threshold, and to compare the generated control signal to the control signal threshold.

The disk drive may further include a notch filter coupled to the actuator and configured to filter the control signal.

The controller may be further configured, after inhibiting writing, to determine if a magnitude of the control signal is below the control signal threshold, and, responsive to the magnitude of the control signal being below the control signal threshold, to enable writing by the read/write head.

DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

The present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. It will be understood that, although the terms first, second, etc. may be used herein to describe various steps, elements and/or regions, these steps, elements and/or regions should not be limited by these terms. These terms are only used to distinguish one step/element/region from another step/element/region. Thus, a first step/element/region discussed below could be termed a second step/element/region without departing from the teachings of the present invention.

The present invention may be embodied in hardware (analog and/or discrete) and/or in software (including firmware, resident software, micro-code, etc.). Consequently, as used herein, the term "signal" may take the form of a continuous waveform and/or discrete value(s), such as digital value(s) in a memory or register.

The present invention is described below with reference to block diagrams of disk drives and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows. Like numbers refer to like elements throughout the description of the figures.

Figure 1:
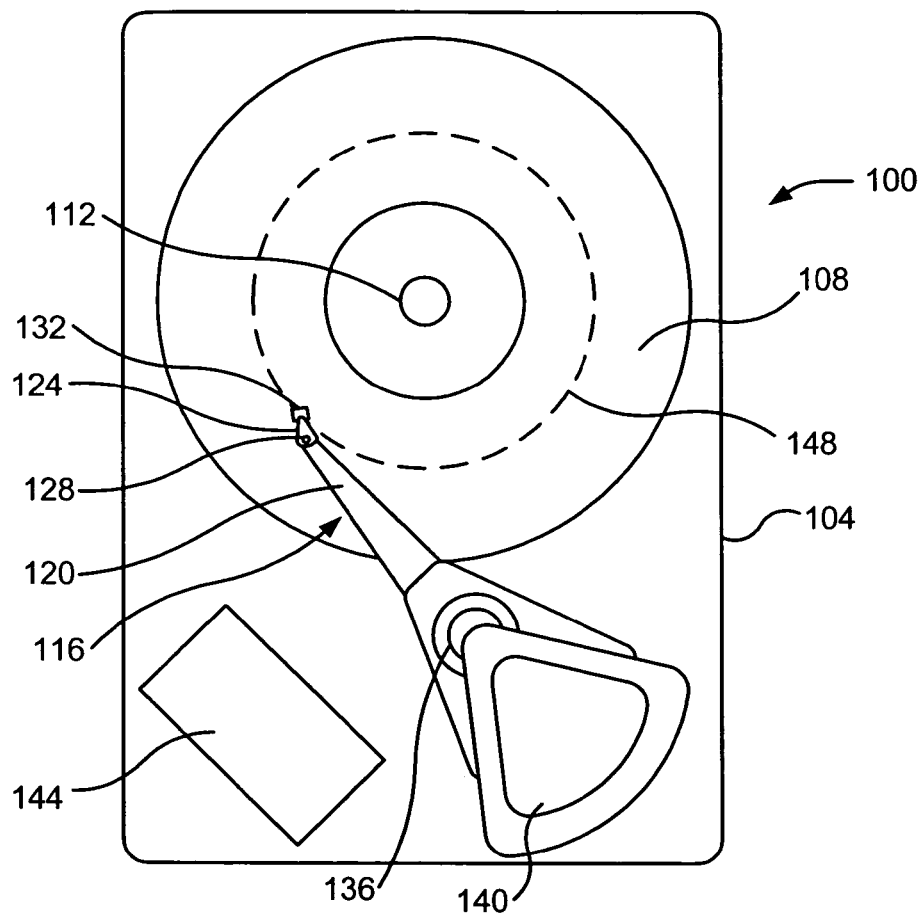
FIG. 1 is a block diagram of a disk drive having dual actuators and a controller that is configured to seek a transducer according to some embodiments of the present invention.

FIG. 1 illustrates a computer disk drive 100 with a dual stage actuator. The disk drive 100 includes a base 104 and one or more data storage disks 108 (only one of which is shown in FIG. 1). The disk 108 may be a magnetic disk, an optical disk, or any other type of data storage disk, and may have data storage tracks defined on one or both of its storage surfaces. The disk 108 is interconnected to the base 104 by a spindle motor (not shown) mounted within or beneath the hub 112, such that the disk 108 can be rotated relative to the base 104.

An actuator arm assembly 116 includes a first member 120 and a second member 124. The first member 120 is coupled between the base 104 and the second member 124, and the members 120 and 124 can provide two stages of movement. Interconnecting the first member 120 and the second member 124 of the actuator arm assembly 116 is a microactuator 128. A transducer 132 is mounted on a distal portion of the actuator arm assembly 116. In particular, the transducer 132 can be coupled to an end of the second member 124 of the actuator arm assembly 116 so that it can be positioned adjacent to a storage surface of the disk 108. Although only one actuator arm assembly 116 is shown in FIG. 1, it is to be understood that a plurality of the actuator arm assemblies 116 may be interconnected and configured to position a transducer adjacent to each respective data storage surface of a stack of the disks 108.

The first member 120 of the actuator arm assembly 116 can be interconnected to the base 104 by a bearing 136. A coarse actuator 140 can pivot the actuator arm assembly 116 about the bearing 136 to position the actuator arm assembly 116 and, thereby, position the transducer 132 with respect to the disk 108. In particular, the coarse actuator 140 positions the transducer 132 to allow it to access a desired data track or cylinder 148 on the disk 108. The coarse actuator 140 is configured to position the microactuator 128 and, thereby, the transducer 132 over a first range of movement that may correspond to the distance between an inner and outer diameter of the storage surface of the disk 108. The coarse actuator 140 may be, for example, a motor such as a voice coil motor (VCM).

The articulation of the second member 124 with respect to the first member 120 of the actuator arm assembly 116 may be achieved by, for example, providing a journal bearing as part of the microactuator 128, by providing a flexible interconnection between the second member 124 and the first member 120, or by otherwise joining the second member 124 to the first member 120 in such a way that the second member 124 is allowed to move with respect to the first member 120.

The microactuator 128 is configured to position the transducer 132 relative to the disk 108 over a second range of movement that is less than the first range of movement provided by the coarse actuator 140. The microactuator 128 may effect finer positioning and/or higher frequency movements of the transducer 132 within its range of movement (e.g., over relatively short distances), such as that which may be encountered during short seeks (e.g., a few tracks) or during track following, compared to the coarse actuator 140. The microactuator 128 may also be utilized during the settle phase of long seeks when the distance between the transducer 132 and the target track is within the motion range of the microactuator, in order to reduce settle time. The microactuator 128 may be any mechanism capable of moving the transducer 132 relative to the first member 120 by adjusting the position of the second member 124 relative to the first member 120. For example, the microactuator 128 may be a piezoelectric actuator, an electromagnetic actuator, or an electrostatic actuator. Accordingly, the microactuator 128 may move the transducer 132 faster across the disk 108, within its range of movement, than may be possible with the coarse actuator 140.

A controller 144 is configured to control movement of the transducer 132 relative to the disk 108 via the coarse actuator 140 and the microactuator 128. The controller 144 moves the transducer 132 in two primary modes: a seek mode and a track following mode. During the seek mode, the controller 144 can be configured to move the transducer 132 from an initial track to a target track for which the host device has requested access using the coarse actuator 140, the microactuator 128, and/or a combination thereof.

The controller 144 may simultaneously control both the coarse actuator 140 and the microactuator 128 when seeking the transducer 132. For example, the controller 144 may control the microactuator 128 to rapidly move the transducer 132 toward the target track while controlling the coarse actuator 140 to move the microactuator 128 and, thereby, the transducer 132 toward the target track. When the seek distance is within the range of movement of the microactuator 128, the transducer 128 may be primarily moved to the target track by the microactuator 128. As will be appreciated by one having skill in the art, the coarse actuator 140 and the microactuator 128 may be simultaneously controlled by the controller 144 by multitasking between operations that separately control the coarse actuator 140 and the microactuator 128, and/or the controller 144 may include two or more control units that control the coarse actuator 140 and the microactuator 128 in parallel. Following the seek mode when the transducer 132 has become substantially aligned with the target track, the controller 144 switches to the track following mode in which the transducer 132 is maintained over the target track primarily by the action of the microactuator 128 while data is read from and/or written to the target track on the disk 108.

Figure 2:
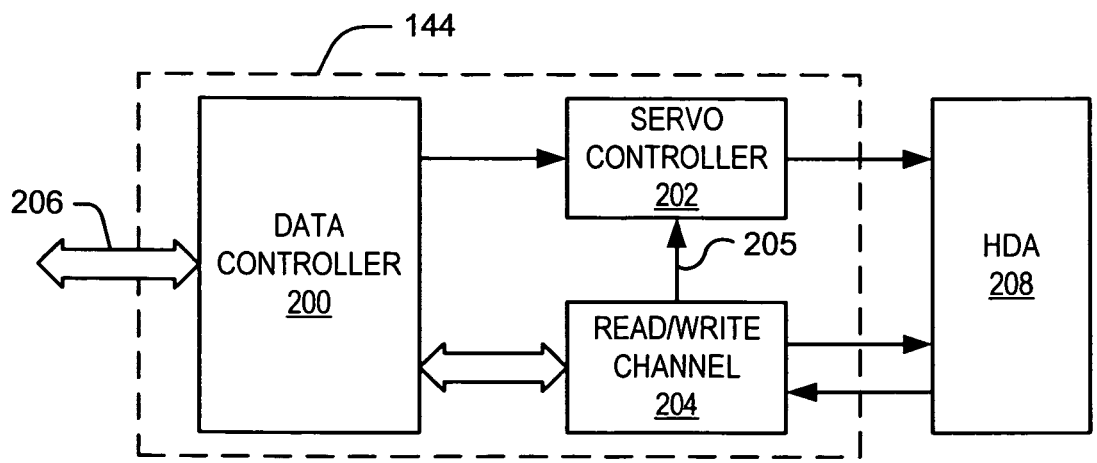
FIG. 2 is a block diagram of the controller of FIG. 1 in accordance with some embodiments of the present invention.

Referring to FIG. 2, the controller 144 can include a data controller 200, a servo controller 202, and a read/write channel 204. The exemplary embodiment of the controller 144 has been illustrated with components that include two separate controllers 200, 202 and read/write channel 204 for purposes of illustration and discussion only. It is to be understood that the functionality that is described herein for these components may be consolidated in fewer components and/or distributed among more components.

The controller 144 is configured to respond to read and write instructions via a communication link 206 from a host device by reading and writing data on a head disk assembly (HDA) 208. The HDA 208 can include the actuator arm assembly 116, the disk stack 108, the microactuator 128, the coarse actuator 140, and the spindle motor. The read/write channel 204 can operate in a conventional manner to convert data between the digital form used by the data controller 200 and the analog form conducted through the transducer 132 in the HDA 208. The read/write channel 204 provides servo positional information read from the HDA 208 to the servo controller 202 via line 205. The servo positional information can be used by the servo controller 202 to track the radial and circumferential location of the transducer 132 in relation to tracks and block addresses on the disk 108. The servo controller 202 can use the servo positional information to seek the transducer 132 to a target (e.g., host addressed) track and block on the disk 108, and to maintain the transducer 132 aligned with the target track while data is written/read on the disk 108.

The seek mode can include an initial phase and a settle phase. In the initial phase of the seek mode, the servo controller 202 primarily accelerates the transducer 132 from an initial position toward the target track by applying a control signal to the coarse actuator 140 and/or the microactuator 128. The control signal may include a current signal and/or a voltage signal, depending on the type of actuator being controlled. When the transducer 132 reaches a threshold distance from the target track and/or reaches a threshold velocity, the servo controller 202 switches to the settle phase of the seek mode. In the settle phase, the servo controller 202 controls the transducer 132 along a trajectory that brings the transducer 132 into alignment with the target track (such as along a centerline of the target track) with, preferably, minimum position overshoot or undershoot relative to the target track. Position undershoot/overshoot may result in a longer seek duration.

In the track following mode, the servo controller 202 primarily controls the transducer 132 using the microactuator 128. In embodiments in which the microactuator 128 includes a piezoelectric transducer (PZT), the microactuator 128 may be controlled using a filtered voltage signal applied to the microactuator 128.

Figure 3:
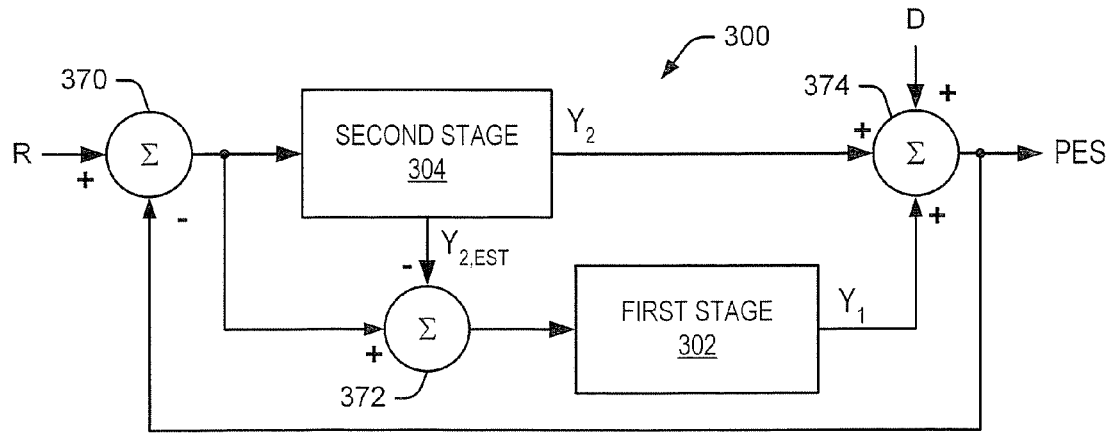
FIGS. 3 and 4 are block diagrams of the servo controller of FIG. 2 in accordance with some embodiments of the present invention.

FIG. 3 is a block diagram of a servo system 300 including a two-stage actuator. The servo system 300 may be embodied as a software program running on a digital signal processor, but one of ordinary skill in the art will recognize that control systems such as the servo system 300 described herein could be implemented in hardware.

The servo system 300 includes a first stage 302, which may include a coarse actuator 140, and a second stage 304 that may include the microactuator 128. As described above, the disk 108 includes a plurality of data storage tracks defined thereon in the form of generally concentric circles centered about a spindle axis. The first stage 302 controls the coarse actuator 140 and the second stage 304 controls the microactuator 128 to position the transducer 132 adjacent a desired one of the tracks. First and second actuator control signals for the coarse actuator 140 and the microactuator 128, respectively, are generated as part of the servo system 300.

In operation, an input signal R is combined with a position error signal PES at a first summation node 370. The output of the first summation node 370 represents a desired movement of the transducer 132 (i.e. to move to a desired location and/or to correct for a non-zero PES). The input signal R may be zero in track following mode, in which case the servo system 300 attempts to move the transducer 132 in response to the PES with a goal of reducing the PES to zero (by, for example, moving the transducer 132 toward the centerline of the target track).

The second stage 304 receives the output of the first summation node 370 and attempts to move the transducer 132 to the desired location by applying a control signal, such as a voltage and/or current signal, to the microactuator 128. The second stage position signal $Y_2$, shown in FIG. 3 as an output of the second stage 304, represents the actual movement of the transducer 132 as a result of the action of the microactuator 128.

The second stage 304 also produces a second stage position estimate signal $Y_{2,EST}$ that is indicative of an estimated movement of the transducer 132 as a result of the action of the second stage 304. The second stage position estimate signal $Y_{2,EST}$ is subtracted at a second summation node 372 from the output of the first summation node 370. The output of the second summation node 372 is provided to the first stage 302. Thus, the first stage 302 attempts to move the transducer 132 to a desired location that is based on the input signal R and the position error signal PES, as adjusted by the estimated movement of the transducer 132 caused by the action of the second stage 304.

A first stage position signal $Y_1$ represents the actual movement of the transducer 132 as a result of the action of the first stage 302. A third summation node 374 combines the first and second stage position signals $Y_1$ and $Y_2$ along with any system disturbances D which may include, for example, operational shock and/or vibration. The position error signal PES is thus generated in response to the first and second position signals $Y_1$ and $Y_2$ along with any system disturbances D.

The frequency response of the first stage 302 may be different from that of the second stage 304. For example, a second stage 304 including a piezoelectric microactuator typically has a wider gain distribution than a first stage 302 including a voice coil motor. The overall bandwidth of the system 300 is thus determined by the wider bandwidth associated with the second stage 304. The gain variation of the second stage 304 thus directly affects the bandwidth and stability margins of the entire system 300.

Figure 4:
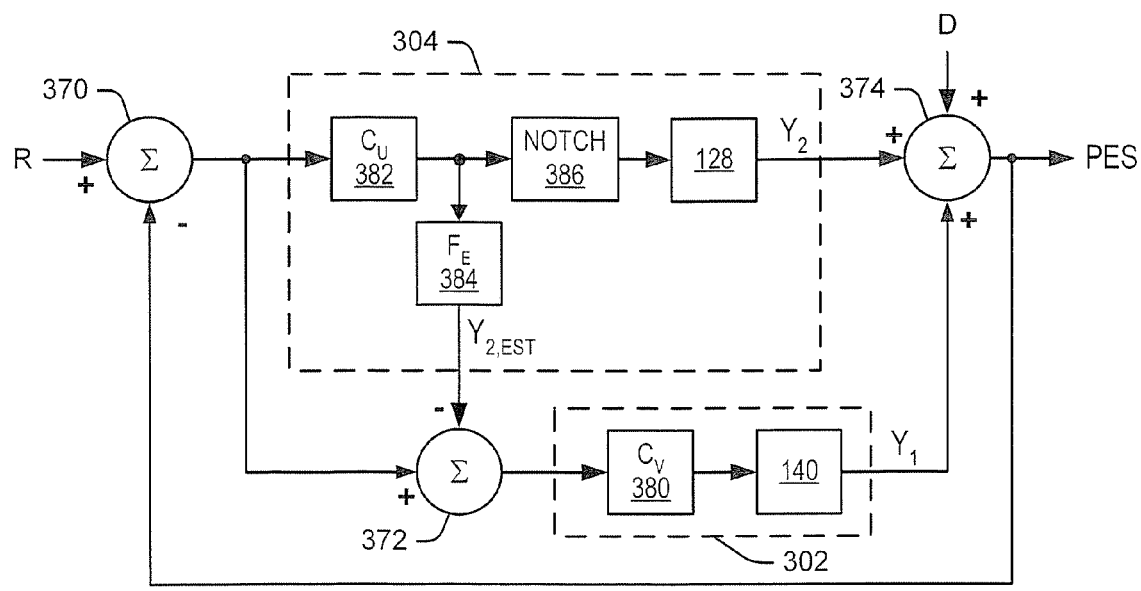

Referring to FIG. 4, the first stage 302 may include a first stage controller 380 and the coarse actuator 140. The first stage controller 380 is configured to receive the output of the second summation node 372 and generate a control signal to cause the coarse actuator 140 to move the transducer 132 to a desired location.

The second stage 304 may include a second stage controller 382, an estimator circuit 384, a notch filter 386, and the microactuator 128. The second stage controller 382 is configured to generate a control signal for controlling the microactuator 128 in response to the output of the first summation node 370. The estimator circuit 384 is configured to generate the second stage position estimate signal $Y_{2,EST}$ in response to an output of the second stage controller 382. The notch filter 386 is configured to selectively remove certain frequencies from the control signal generated by the second stage controller 382 in order to reduce and/or minimize unwanted vibrations that may be characteristic to the mechanical design of the actuator system.

Since the second stage 304 has a significantly smaller range of motion than the first stage 302, the control signal applied to the second stage 304 may saturate, or reach its operational limit, if the output of the first summation node 370 exceeds the range of motion of the second stage 304.

As noted above, a conventional disk drive may be configured to inhibit writes when the position error signal exceeds a threshold value. However, because the position error signal is a feedback signal, it is possible that off-track writes will occur before the position error signal is measured and processed by the servo controller 202. According to some embodiments of the invention, writes may be inhibited in response to a predictive metric, as opposed to a measured feedback signal, exceeding a predetermined level. For example, writes to a disk surface may be inhibited in response to a control signal for an actuator stage exceeding a threshold level. In some other embodiments, writes to a disk surface may be inhibited in response to a position error signal or a predictive metric such as an actuator control signal.

For a dual stage actuator 116 including a coarse actuator 140 (such as a VCM) and a microactuator 128 (such as a piezoelectric transducer), the control signal may be provided to control the first stage and/or the second stage. In particular embodiments, disk writes may be inhibited in response to the control signal that controls a second stage, voltage controlled actuator. That is, in some embodiments of the invention, the control signal generated for the second stage actuator may be checked to determine if it exceeds a threshold value. If so, disk writes may be inhibited for a period of time, for example, until the system has settled. In other embodiments, disk writes may be inhibited based on the control signal or a position error measurement. Transducer velocity and/or acceleration may also be considered in determining whether to inhibit disk writes.

The second stage 304 of a dual stage actuator may typically have a range of movement that spans a few tracks. Thus, for a disk drive with a dual-stage actuator operating in track following mode, most of the transducer position adjustments will be performed by the second stage 304. Referring to FIG. 3, since the input signal R is typically zero in track following mode, and the position error signal PES is typically less than one track, the estimated position signal $Y_{2,EST}$ of the second stage 304 will typically cancel out the output of the first summation node 370. Thus, small disturbances may be absorbed by the second stage microactuator 128.

However, if a sufficiently large operational shock occurs, the second stage control signal may saturate in response to a rapidly increasing position error signal. That is, since the second stage microactuator 128 actively compensates for the position error, the position error signal may remain within acceptable limits for a brief period of time after the shock is received. However, during this time, the control signal applied by the second stage actuator may increase to a point where it saturates (i.e. reaches its maximum value). Thus, if the magnitude of the second stage control signal is large, and/or if the rate of change of the second stage control signal is large, it may provide an advance indication of a disturbance, such as an operational shock, before the disturbance is reflected in the position error signal. Once the control signal has saturated, further increases in the position error signal may cause the transducer 132 to move off-track, potentially resulting in off-track writes.

Figure 8:
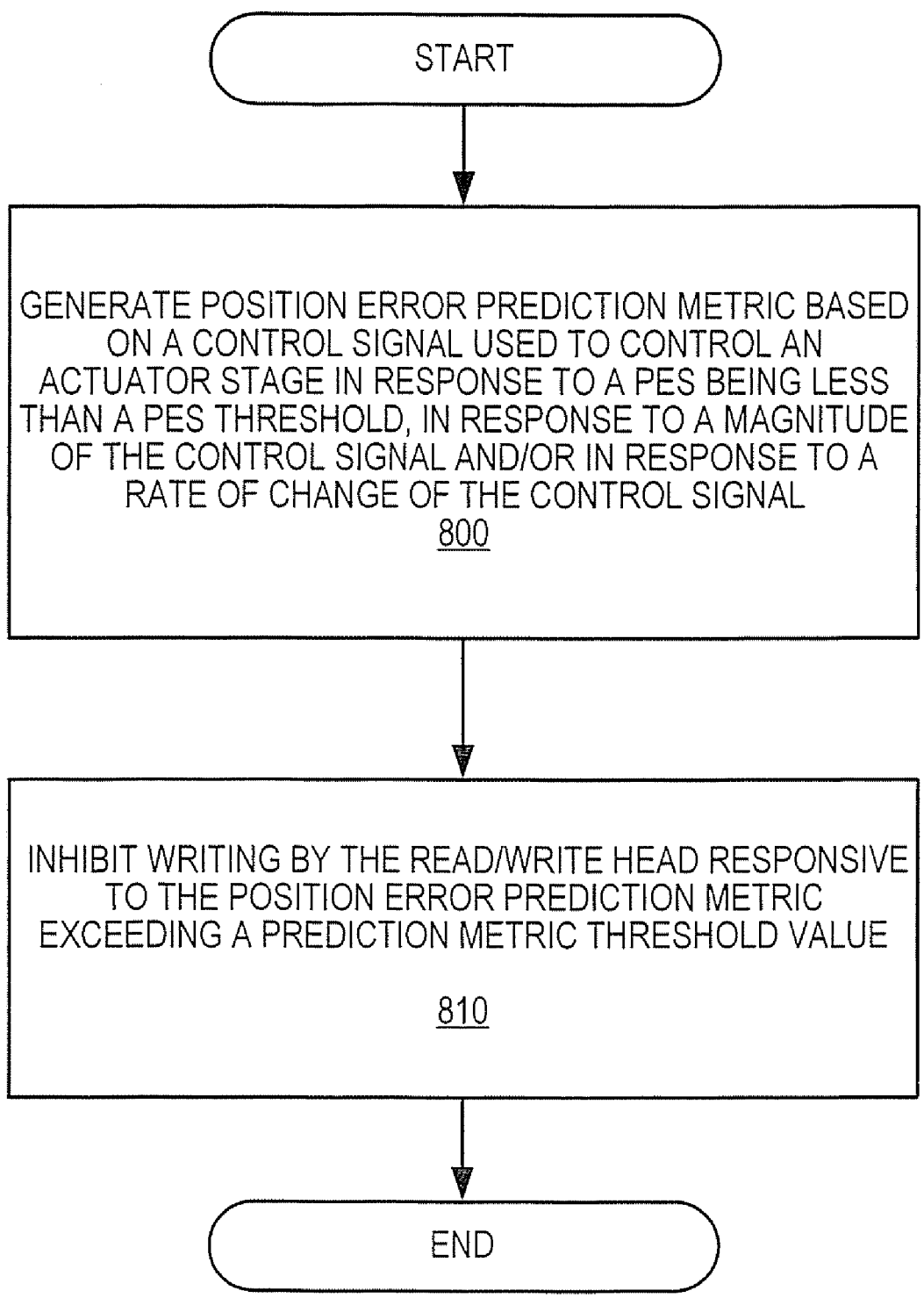

Methods according to further embodiments of the invention of controlling a read/write head of a disk drive including an actuator stage configured to move the read/write head relative to a data storage disk are illustrated in FIG. 8. The methods include generating a position error prediction metric that is based on a control signal used to control the actuator stage and that is predictive of a position error of the read/write head relative to a desired radial location on the data storage disk (Block 800), and responsive to the position error prediction metric exceeding a prediction metric threshold value, inhibiting writing by the read/write head (Block 810). Generating the position error prediction metric may be performed in response to a position error signal being less than a position error threshold value. The position error prediction metric may be generated in response to a magnitude of the control signal and/or a rate of change of the control signal.

According to some embodiments of the invention, a maximum control signal for an actuator may be determined. The maximum control signal may be obtained as a calibrated value and/or may be a stored value. The control signal determined by the second stage controller 382 in response to the output of the first summing node 370 may be compared to the maximum control signal. In some embodiments, disk writes may be inhibited if the control signal exceeds a defined percentage of the maximum control signal. The defined percentage may be a stored value such as, for example, 85%, in which case disk writes may be inhibited if the control signal to be applied to the microactuator 128 exceeds 85% of the maximum control signal.

In some embodiments, the defined percentage may be a function of the position error signal. For example, if the value of the position error signal is relatively high, then the defined percentage of control signal may be lowered, so that writes may be inhibited if the control signal exceeds a lower threshold level.

In some embodiments, the position error signal threshold level may be set in response to the magnitude of the control signal. That is, if a control signal is relatively large, the position error signal threshold may be reduced, so that writes may be inhibited more readily based on the position error signal when a large control signal is being applied.

Figure 5:
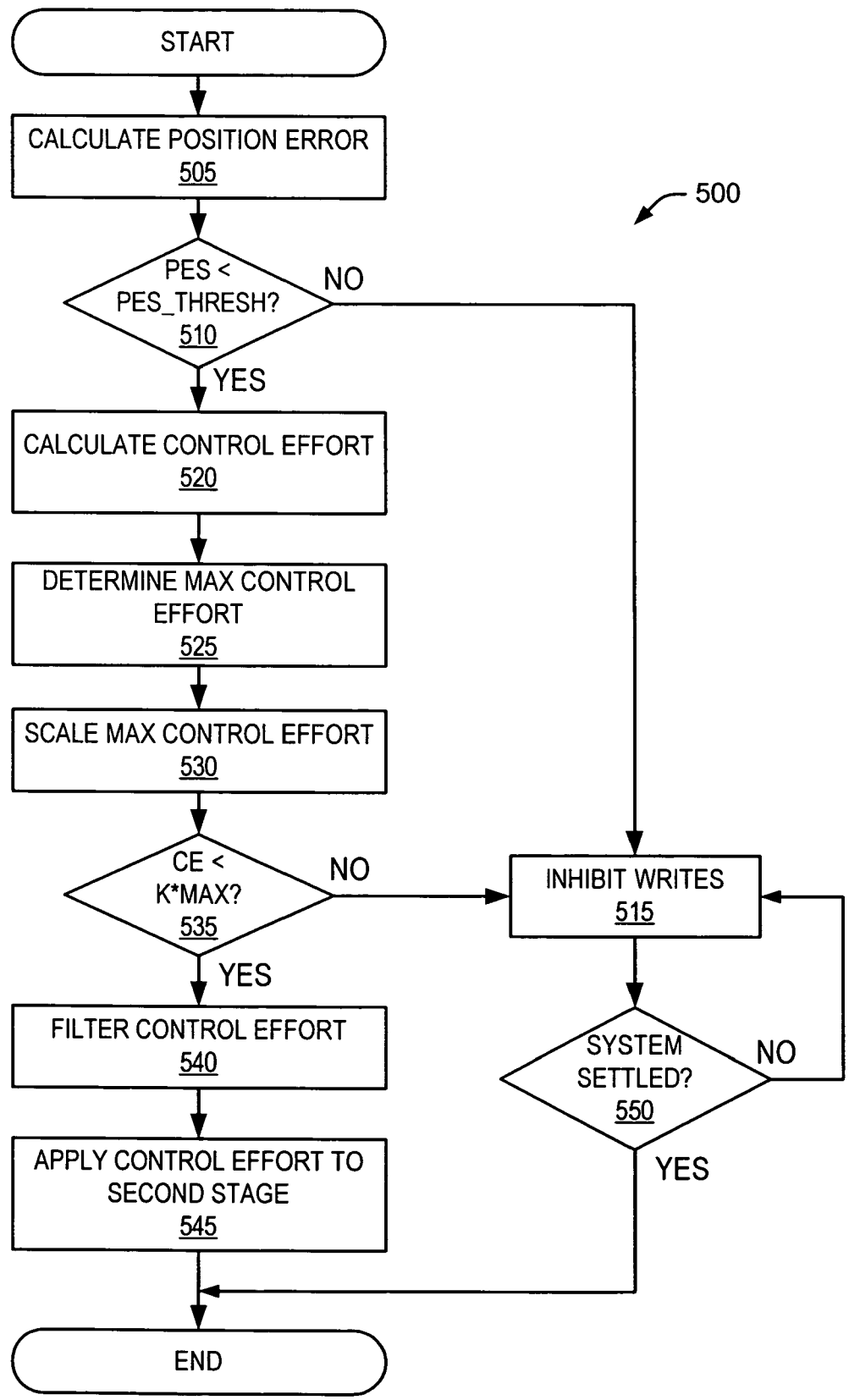
FIGS. 5 and 8 are flowcharts illustrating operations of a servo controller configured according to some embodiments of the invention.

Operations 500 according to some embodiments of the invention are illustrated in FIG. 5. As shown therein, a position error may be calculated (block 505), for example, based on position feedback information received by the servo controller 202 from the read/write channel 204 via link 205 (FIG. 2). The servo controller 202 may compare the position error signal to a position error threshold PES_THRESH (block 510). If the position error signal is greater than or equal to PES_THRESH, then disk writes are inhibited (block 515).

If the position error signal is less than the position error threshold PES_THRESH, then a second stage control signal CE is calculated by the second stage controller 382 (FIG. 4) (block 520). The servo controller 202 determines the maximum control signal MAX for an actuator such as the second stage microactuator 128 (block 525). The maximum control signal MAX may be determined as a calibrated value and/or may be a stored value.

The maximum control signal for the second stage microactuator 128 may then be scaled by a scale factor K to provide a scaled maximum control signal K*MAX. In some embodiments, the scale factor may be about 0.85. Thus, the scaled maximum control signal may be about 85% of the value of the maximum control signal. Other scale factors may be used depending on the level of sensitivity desired.

The calculated second stage control signal CE is then compared to the scaled maximum control signal K*MAX (block 535). If the second stage control signal CE is greater than or equal to the scaled maximum control signal K*MAX, then disk writes are inhibited (block 515). Otherwise, the control signal is filtered, for example by the notch filter 386 (block 540) and applied to the second stage microactuator 128 (block 545).

Once writes are inhibited (block 515), the servo controller may check to see if the system has settled (block 550), which may involve checking the position error signal and/or the control signal level. The system may be considered to be settled after the position error signal has fallen below the position error signal threshold PES_THRESH and/or the second stage control signal has fallen below the scaled maximum control signal K*MAX. In some embodiments, the system may wait for a defined number of disk rotations or partial rotations after the position error signal and the second stage control signal are within limits before resuming disk writes.

Figure 6A:
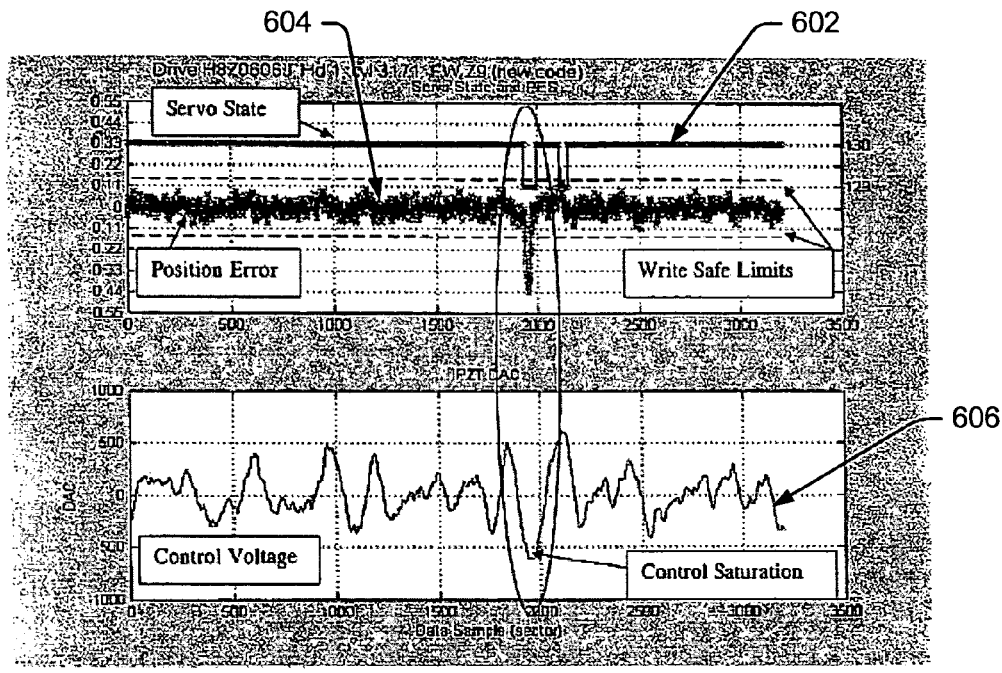
FIGS. 6A and 6B are graphs of control voltage, servo state and position error for a disk drive servo system configured according to some embodiments of the invention.
Figure 6B:
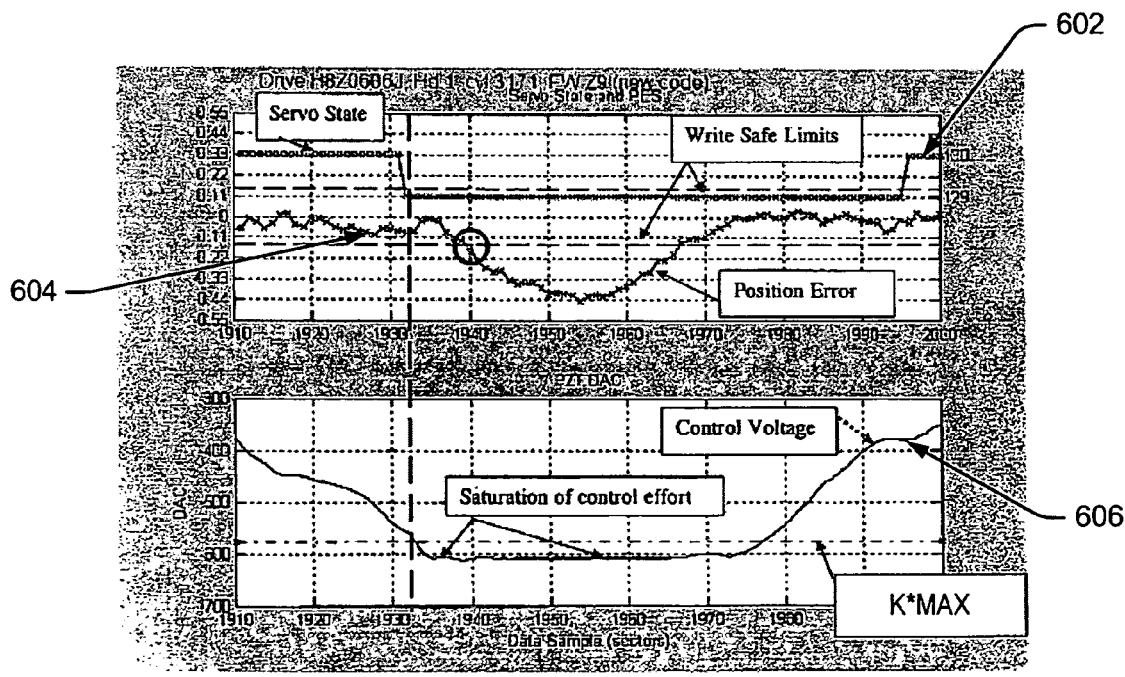

FIGS. 6A and 6B are graphs of position error, servo state, and control voltage for a second stage microactuator of a disk drive configured according to some embodiments of the invention. FIG. 6A is a graph having a time scale (X-axis) extending from 0 to 3500 samples, while FIG. 6B shows a portion of the same graph as FIG. 6A from samples 1910 to 2000. Thus, FIG. 6B shows an enlarged portion of the graph of FIG. 6A.

Referring to FIG. 6A, when the servo state (indicated by curve 602) is high, writes are enabled. The position error signal PES is indicated by curve 604, while the control signal is indicated by curve 606. Write safe limits, which may be arbitrary limits defined by the disk drive manufacturer, are illustrated in FIGS. 6A and 6B. For example, a write safe limit of about +/−0.16 tracks may provide a suitable margin in some systems.

As shown in FIG. 6B, a system disturbance caused the magnitude of the control voltage 606 to exceed the control signal threshold K*MAX just after sample no. 1930, after which the control voltage 606 saturated. In response to the magnitude of the control voltage 606 exceeding K*MAX, the servo state 602 was changed to low, thereby inhibiting further writes. Shortly after the control voltage 606 saturated, the position error signal PES 604 fell below the lower write safe limit. Thus, in accordance with embodiments of the invention, writes were inhibited before the position error signal PES 604 exceeded the PES threshold. The likelihood of an off-track write was thus greatly reduced in this situation.

After the position error signal PES 604 and the control voltage 606 fell below their respective threshold values (i.e. returned to within safe writing limits) and a number of samples had passed, the servo state 602 was changed back to high, thereby enabling disk write operations.

Figure 7:
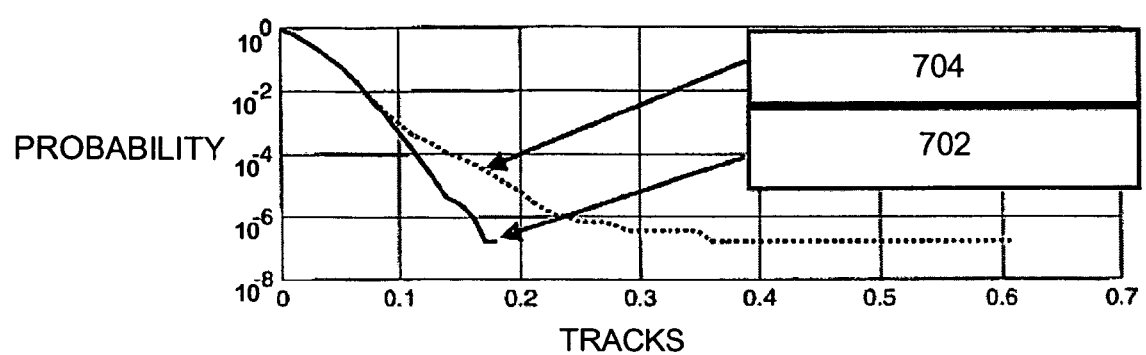
FIG. 7 is a graph of a cumulative probability distribution showing the cumulative probability of a position error as a function of the size of the position error in tracks for an exemplary embodiment of the invention and a comparative example.

FIG. 7 is a graph of a cumulative probability distribution showing the cumulative probability of a position error (Y-axis) as a function of the size of the position error in tracks (X-axis) for an exemplary embodiment of the invention (curve 702) and a comparative example (curve 704). In the comparative example, disk writes were inhibited using only a position error threshold PES_THRESH of 0.16 tracks. In the example embodiment, disk writes were inhibited if the second stage control voltage exceeded 85% of the maximum control voltage for the second stage actuator or if the position error signal exceeded a position error threshold PES_THRESH of 0.16 tracks. A total of 6.4 million data points were taken for the exemplary embodiment and a total of 6.4 million data points were taken for the comparative example, and the results were analyzed and plotted in FIG. 7.

As illustrated in FIG. 7, the probability of a position error greater than 0.1 tracks occurring during a write was substantially lower in the exemplary embodiment in which disk writes were inhibited in response to the actuator control signal or the position error signal than in the comparative example, in which disk writes were inhibited based only on the position error signal.

The effect on the drive throughput for the exemplary embodiment was minimal. Read and write tests under vibration were performed on two different disk drives for both the comparative example (Comp) and the exemplary embodiment (New). The results of the test are shown in Table 1. As shown therein, compared to the comparative example, the exemplary embodiment reduced data throughput by only 0.19% on one drive and 0.21% on the other drive during read testing, while data throughput was reduced by only 1.66% and 1.24% on the drives, respectively, during write testing.

TABLE 1

Comparison Test Results

| Drive | Code Level | MN_comment | Baseline Thruput (kBytes/sec) | Vibe Thruput (kBytes/sec) | Vibe Thruput (% of B-line) |
|---|---|---|---|---|---|
| A | Comp | 1GSeqRd256 | 70537 | 64088 | 90.86% |
| A | Comp | 1GSeqWr256 | 71901 | 68888 | 95.81% |
| A | New | 1GSeqRd256 | 68986 | 62547 | 90.67% |
| A | New | 1GSeqWr256 | 72237 | 68009 | 94.15% |
| Difference - Drive A | | 1GSeqRd256 | −1551 | −1540 | −0.19% |
| | | 1GSeqWr256 | 335 | −879 | −1.66% |
| B | Comp | 1GSeqRd256 | 71732 | 67413 | 93.98% |
| B | Comp | 1GSeqWr256 | 72941 | 68681 | 94.16% |
| B | New | 1GSeqRd256 | 71224 | 66785 | 93.77% |
| B | New | 1GSeqWr256 | 72894 | 67733 | 92.92% |
| Difference - Drive B | | 1GSeqRd256 | −508 | −628 | −0.21% |
| | | 1GSeqWr256 | −47 | −948 | −1.24% |

Although some embodiments of the invention have been described with reference to a disk drive including a dual actuator configuration, the disk drive may in some embodiments include a single actuator, and disk writes may be inhibited if the control signal calculated for the single actuator exceeds a defined threshold during track following mode.

The foregoing discussion of the invention has been presented for purposes of illustration and description. Further, the description is not intended to limit the invention to the form disclosed herein. Consequently, variations and modifications commensurate with the above teachings are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments.

What is claimed is:

1. A method of controlling reading/writing by a read/write head of a disk drive, the disk drive including an actuator stage configured to move the read/write head relative to a data storage disk, the method comprising:
   generating a position error prediction metric that is based on a control signal used to control the actuator stage and that is predictive of a position error of the read/write head relative to a desired radial location on the data storage disk; and
   responsive to the position error prediction metric exceeding a prediction metric threshold value, inhibiting writing by the read/write head;
   wherein generating the position error prediction metric is performed in response to a position error signal being less than a position error threshold value.

2. A method of controlling reading/writing by a read/write head of a disk drive, the disk drive including an actuator stage configured to move the read/write head relative to a data storage disk, the method comprising:
   generating a position error prediction metric that is based on a control signal used to control the actuator stage and that is predictive of a position error of the read/write head relative to a desired radial location on the data storage disk; and
   responsive to the position error prediction metric exceeding a prediction metric threshold value, inhibiting writing by the read/write head;
   wherein the position error prediction metric is generated in response to a magnitude of the control signal.

3. A method of controlling reading/writing by a read/write head of a disk drive, the disk drive including an actuator stage configured to move the read/write head relative to a data storage disk, the method comprising:
   generating a position error prediction metric that is based on a control signal used to control the actuator stage and that is predictive of a position error of the read/write head relative to a desired radial location on the data storage disk; and
   responsive to the position error prediction metric exceeding a prediction metric threshold value, inhibiting writing by the read/write head;
   wherein the position error prediction metric is generated in response to a rate of change of the control signal.

4. A disk drive, comprising:
   a data storage disk;
   a read/write head that is configured to read data from the disk and/or to write data to the disk;
   an actuator that is configured to position the read/write head relative to the disk; and
   a controller that is configured to generate a position error signal indicative of a displacement of the read/write head from a desired location on a surface of the disk, and, responsive to the position error signal, to generate a control signal for moving the read/write head to the desired location, wherein the controller is further configured to inhibit writing by the read/write head responsive to a predictive metric that is predictive of the position error signal exceeding a threshold;

wherein the predictive metric comprises a magnitude of the control signal, and wherein the threshold comprises a control signal threshold.

5. The disk drive of claim 4, wherein the controller is further configured to compare the position error signal to a position error signal threshold and to inhibit writing by the read/write head responsive to the position error signal exceeding the position error signal threshold.

6. The disk drive of claim 4, wherein the controller is further configured to determine the position error signal threshold based on the value of the control signal.

7. The disk drive of claim 4, wherein the controller is further configured to determine the control signal threshold based on the value of the position error signal.

8. The disk drive of claim 4 wherein the actuator comprises a piezoelectric transducer and the control signal is used to control movement of the piezoelectric transducer.

9. The disk drive of claim 4, wherein the controller is further configured to determine a maximum level of the control signal, to scale the maximum level of the control signal by a scale factor to generate the control signal threshold, and to compare the generated control signal to the control signal threshold.

10. The disk drive of claim 4, further comprising a notch filter coupled to the actuator and configured to filter the control signal.

11. The disk drive of claim 4, wherein the controller is further configured, after inhibiting writing, to determine if a magnitude of the control signal is below the control signal threshold, and, responsive to the magnitude of the control signal being below the control signal threshold, to enable writing by the read/write head.

12. A disk drive, comprising:
a data storage disk;
a read/write head that is configured to read data from the disk and/or to write data to the disk;
an actuator that is configured to position the read/write head relative to the disk; and
a controller that is configured to generate a position error signal indicative of a displacement of the read/write head from a desired location on a surface of the disk, and, responsive to the position error signal, to generate a control signal for moving the read/write head to the desired location, wherein the controller is further configured to inhibit writing by the read/write head responsive to a predictive metric that is predictive of the position error signal exceeding a threshold;

wherein the predictive metric is generated in response to a rate of change of the control signal.

13. A controller for a disk drive that is configured to generate a position error signal indicative of a displacement of a read/write head from a desired location on a surface of a data storage disk, and, responsive to the position error signal, to generate a control signal for moving the read/write head to the desired location, wherein the controller is further configured to inhibit writing by the read/write head responsive to a predictive metric that is predictive of the position error signal exceeding a threshold;

wherein the predictive metric comprises a magnitude of the control signal, and wherein the threshold comprises a control signal threshold.

14. The controller of claim 13, wherein the controller is further configured to compare the position error signal to a position error signal threshold and to inhibit writing by the read/write head responsive to the position error signal exceeding the position error signal threshold.

15. The controller of claim 13, wherein the controller is further configured to determine the position error signal threshold based on the value of the control signal.

16. The controller of claim 13, wherein the controller is further configured to determine the control signal threshold based on the value of the position error signal.

17. The controller of claim 13, wherein the controller is further configured to determine a maximum level of the control signal, to scale the maximum level of the control signal by a scale factor to generate the control signal threshold, and to compare the generated control signal to the control signal threshold.

18. The controller of claim 13, wherein the controller is further configured, after inhibiting writing, to determine if a magnitude of the control signal is below the control signal threshold, and, responsive to the magnitude of the control signal being below the control signal threshold, to enable writing by the read/write head.

* * * * *